United States Patent
Singh et al.

(10) Patent No.: US 11,340,337 B2
(45) Date of Patent: May 24, 2022

(54) TWO MICROMETER LASER TRANSMITTER FOR 3-D DOPPLER WIND LIDAR FOR SPACE APPLICATIONS

(71) Applicant: UNITED STATES OF AMERICA AS REPRESENTED BY THE ADMINISTRATOR OF NASA, Washington, DC (US)

(72) Inventors: Upendra N Singh, Yorktown, VA (US); Mulugeta Petros, Newport News, VA (US); Tamer F. Refaat, Hampton, VA (US)

(73) Assignee: UNITED STATES OF AMERICA AS REPRESENTED BY THE ADMINISTRATOR OF NASA., Washington, DC (US)

( * ) Notice: Subject to any disclaimer, the term of this patent is extended or adjusted under 35 U.S.C. 154(b) by 596 days.

(21) Appl. No.: 16/716,548

(22) Filed: Dec. 17, 2019

(65) Prior Publication Data
US 2020/0200876 A1 Jun. 25, 2020

Related U.S. Application Data

(60) Provisional application No. 62/782,750, filed on Dec. 20, 2018.

(51) Int. Cl.
*G01C 3/08* (2006.01)
*G01S 7/481* (2006.01)
(Continued)

(52) U.S. Cl.
CPC .......... *G01S 7/4814* (2013.01); *H01S 3/0405* (2013.01); *H01S 3/0623* (2013.01);
(Continued)

(58) Field of Classification Search
None
See application file for complete search history.

(56) References Cited

U.S. PATENT DOCUMENTS

| 2006/0146901 A1* | 7/2006 | Budni | H01S 3/2308 |
| | | | 372/39 |
| 2014/0327904 A1* | 11/2014 | Bossert | G01S 17/58 |
| | | | 356/28 |

FOREIGN PATENT DOCUMENTS

DE 102012219972 A1 * 1/2013 ....... H01S 3/094061

OTHER PUBLICATIONS

Petros et al., "High energy directly pumped Ho:YLF laser", Advanced Solid State Laser Conference, Davos, Switzerland (2009), 4 pages.
(Continued)

*Primary Examiner* — Mark Hellner
(74) *Attorney, Agent, or Firm* — Robin W. Edwards; Helen M. Galus

(57) ABSTRACT

A laser transmitter assembly for use in a Coherent Doppler Wind Lidar ("CDWL") system includes a telescope/scanner assembly, a receiver, and a master oscillator crystal and a power amplifier crystal each constructed of Ho:YAG. The crystals are end-pumped to transmit an output beam through the telescope/scanner assembly with a high repetition rate of 200-300 Hz and 35 mJ of energy. As part of the CDWL system, a pump laser end-pumps the master oscillator and power amplifier crystals using a pump beam having a nominal wavelength of 1.905 µm. A seed laser transmits a seeding beam into the master oscillator crystal at a nominal wavelength of 2.0965 µm. The telescope/scanner assembly transmits the generated laser beam through an atmosphere toward a scene of interest, collects a backscattered return signal, and communicates the backscattered return signal to the receiver during operation of the CDWL system.

19 Claims, 6 Drawing Sheets

(51) Int. Cl.
   *H01S 3/23*     (2006.01)
   *H01S 3/16*     (2006.01)
   *H01S 3/094*    (2006.01)
   *H01S 3/06*     (2006.01)
   *H01S 3/117*    (2006.01)
   *H01S 3/04*     (2006.01)

(52) U.S. Cl.
   CPC .. *H01S 3/094038* (2013.01); *H01S 3/094042* (2013.01); *H01S 3/117* (2013.01); *H01S 3/161* (2013.01); *H01S 3/1616* (2013.01); *H01S 3/1643* (2013.01); *H01S 3/1653* (2013.01); *H01S 3/2308* (2013.01)

(56) References Cited

OTHER PUBLICATIONS

Zhang et al., Single-frequency, injection-seeded Q-switched Ho:YAG ceramic laser pumped by a 1.91μm fiber-coupled LD, Optics Express, Nov. 28, 2016, 7 pages, vol. 24, No. 24, 27805-27811.

Singh et al., "Twenty years of Tm:Ho:YLF and LuLiF laser development for global wind and carbon dioxide active remote sensing," Optical Materials Express, Apr. 1, 2015, 11 pages, vol. 5, No. 4, 827-837.

Kavaya et al., "The Doppler Aerosol Wind (DAWN) Airborne, Wind-Profiling Coherent-Detection Lidar System: Overview and Preliminary Flight Results," Journal of Atmospheric and Oceanic Technology, Oct. 25, 2013, pp. 826-842, vol. 31.

\* cited by examiner

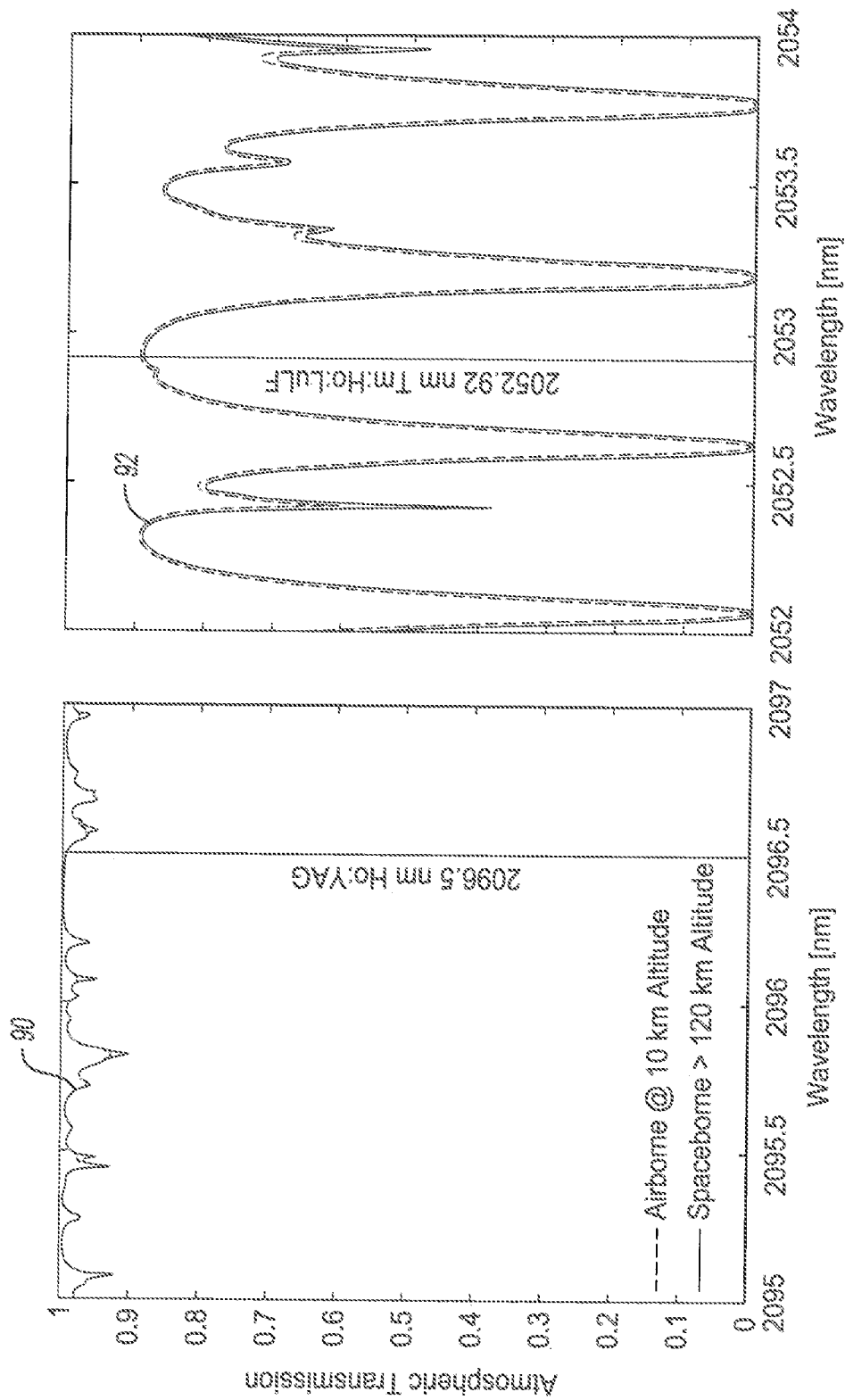

| Parameter | Description |
|---|---|
| Laser Crystal Material | Ho:YAG |
| Laser Configuration | MOPA |
| Output Energy | >35 mJ |
| Output Wavelength | 2096.5 nm |
| Pulse Length | >200 ns |
| PRF | 200 - 300 Hz |
| Polarization | Linear > 100:1 |
| Beam Quality | 1.04 |
| Laser Spectral Width | < 5MHz Transform Limit |
| Pump Tm:Fiber Wall Plug Efficiency | 21% [SBIR P2] |
| Optical Efficiency | 30% |
| Wall Plug Efficiency | 5% |

Fig-6

TWO MICROMETER LASER TRANSMITTER FOR 3-D DOPPLER WIND LIDAR FOR SPACE APPLICATIONS

CROSS-REFERENCE TO RELATED PATENT APPLICATION(S)

This patent application claims the benefit of and priority to U.S. Provisional Patent Application Ser. No. 62/782,750, filed on Dec. 20, 2018, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Up-to-date accurate information regarding prevailing global and local wind conditions is essential to the successful performance of a host of operations. To this end, sensitive Doppler-based radar and lidar systems are commonly used to collect wind data at various altitudes. Societal benefits resulting from improved wind data collection methods and equipment include transformational improvements in the accuracy of weather forecasts, tracking of greenhouse gasses and pollution, fire mitigation, weather-based loss mitigation, and the overall understanding of the effects of atmospheric and atmosphere-ocean processes as they relate to global climate change investigations.

The spatial and temporal resolution of numerical weather and climate models continue to improve, which enables extraction of useful information from available geophysical observations. However, the limited capability of measuring prevailing global winds, particularly from Earth orbit, remains a major barrier for improving the overall understanding of elements associated with specific Earth systems, e.g., global hydrological cycles and water resources, weather and air quality, marine and terrestrial ecosystems, natural resource management, and climate viability and change. As a result, the accurate detection of global winds has emerged as a priority. Doppler lidar systems in particular continue to evolve, with single-wavelength Coherent Doppler Wind Lidar ("CDWL") systems now being explored in earnest for high-altitude global wind applications.

SUMMARY

The present disclosure pertains to an improved laser transmitter assembly suitable for use in a Coherent Doppler Wind Lidar ("CDWL"), as well as to systems and methods employing the disclosed laser transmitter assembly. More specifically, the present disclosure pertains to lasers emitting a narrow beam at a nominal wavelength of 2 µm, i.e., 1.9 µm to 2.1 µm. Such lasers have been used successfully as "eye-safe" surgical lasers and in other industries. However, atmospheric and thermal performance of existing CDWL configurations at the 2 µm wavelength remain less than optimal. As a result, there remains a fundamental need for an advanced laser transmitter assembly. The solutions described herein satisfy such a need by providing a high repetition rate, high beam quality with a sufficiently long pulse length and narrow line width. Additionally, the disclosed solutions operate in a high atmospheric transmission region suitable for space-based, airborne, and terrestrial wind studies.

The above characteristics are desirable when performing lidar-based wind measurements to ensure sufficiently high vertical resolution measurements, e.g., 1-2 m/s. Such resolution is particularly advantageous when used in space-based remote sensing applications, e.g., measurement quantification, and tracking of global winds from Earth orbit. Beneficial applications of the present disclosure are not limited to space-based platforms, however. For instance, the enhanced portability enabled by the disclosed construction and associated methodology may be used to advantage when hosted aboard aircraft, terrestrial towers, and mobile weather vans or other mobile or fixed platforms without limitation.

In a particular embodiment, a laser transmitter assembly for use in CDWL system includes a telescope/scanner assembly, a receiver, a master oscillator crystal constructed of Ho:YAG, and a power amplifier crystal constructed of Ho:YAG. The master oscillator crystal and the power amplifier crystal are end-pumped to transmit an output beam through the telescope/scanner assembly with a high repetition rate of 200-300 Hz. The laser transmitter assembly also includes a pump laser configured to end-pump the master oscillator crystal and the power amplifier crystal using a pump beam having a nominal wavelength of 1.905 µm, and a seed laser configured to transmit a seeding beam into the master oscillator crystal at a nominal wavelength of 2.0965 µm and a power level of about 20-30 mW. The telescope/scanner assembly is configured to transmit the output beam through an atmosphere toward a scene of interest, collect a backscattered return signal, and communicate the backscattered return signal to the receiver during operation of the CDWL system.

In certain embodiments, the pump laser is a Tm:YLF fiber, and may have a pulse length of 3-5 ms.

The seed laser may be embodied as a narrow line width continuous wave laser. The total beam energy of the output beam may be at least 35 mJ. About 20% of a total pump energy may be applied to the master oscillator crystal, and about 80% of the energy of the pump laser may applied to the power amplifier crystal.

The total pump power in some embodiments is 100 W or less.

In certain configurations, the Ho concentration in the master oscillator crystal and power amplifier crystal is between 0.5% and 1.0%. The master oscillator crystal may be 40-50 mm in length, with a square cross section of about 2.5 mm.

One or more dichroic mirrors of the laser transmitter assembly may be coated to pass pump wavelengths of 1.905 µm and reflect a generated wavelength of 2.0965 µm.

The laser transmitter cavity may have a linear resonator cavity length of 2.8 m in some configurations, and may include a Q-switch constructed, e.g., of a Tellurium dioxide material.

A high thermal conductor such as a heat pipe may be used to cool or stabilize respective temperatures of the master oscillator crystal, the power amplifier crystal, and the Q-switch.

A method is also disclosed for detecting and quantifying wind using a CDWL system. In a possible embodiment, the method includes end-pumping a Ho:YAG master oscillator crystal and a Ho:YAG power amplifier crystal of a laser transmitter assembly with a pump beam from a pump laser. The pump beam in this embodiment has a wavelength of 1.905 µm and a total pump power of less than 100 W. End-pumping produces a pulse repetition frequency of 200-300 Hz at a wavelength of 2.0965 µm. The method includes injecting a seeding beam into the master oscillator crystal via a seed laser at a wavelength of 2.0965 µm and a power level of 20-30 mW, as well as transmitting an output laser beam through a telescope/scanner assembly of the CDWL system via the power amplifier crystal at total beam energy of 35 mJ or more.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE SEVERAL VIEWS OF THE DRAWINGS

FIGS. 5A and 5B are plots of atmospheric transmission (y-axis) versions wavelength (x-axis) describing relative advantages of the 2 µm laser transmitter assembly depicted in FIGS. 2 and 3.

FIG. 6 is a table of exemplary specifications for the advanced 2 µm laser transmitter assembly of the present disclosure.

Figure 1:
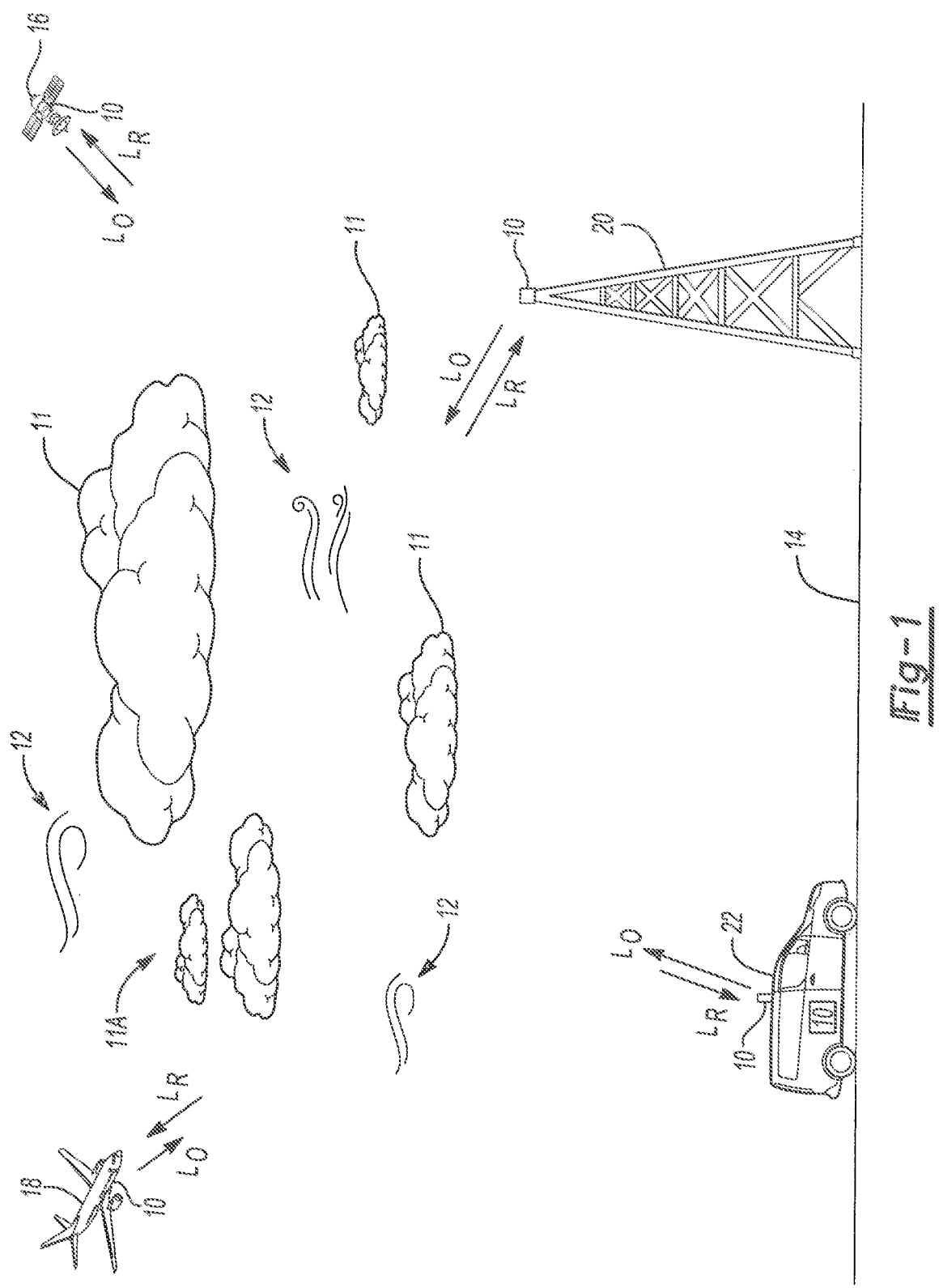
FIG. 1 is schematic illustration of various platforms hosting a Coherent Doppler Wind Lidar ("CDWL") system equipped with an improved 2 µm laser transmitter assembly configured as set forth herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a Coherent Doppler Wind Lidar ("CDWL") system 10 is described herein for use in measuring and quantifying three-dimensional ("3-D") winds 12 at various altitudes above ground surface 14. As will be appreciated by those of ordinary skill in the art, such 3-D winds 12 in Earth-based studies may become increasingly dynamic in the upper regions of the troposphere and extending into the stratosphere, e.g., polar and subtropical jet streams, trade winds, polar easterlies and westerlies, etc. Wind 12 having different velocities in three-dimensional space is also present at lower altitudes, such as the planetary boundary layer down to ground surface 14. The present teachings may be used to advantage generate wind data descriptive of the characteristics of the wind 12 at the various directions, altitudes, and to thereafter use the collected wind data in support of accurate weather forecasting across a range of diverse disciplines. Similarly, the CDWL system 10 may be used to measure extraterrestrial winds, e.g., 3-D winds in the Martian atmosphere or atmospheres of other planetary bodies, and therefore Earth-based observation as described herein is exemplary and non-limiting.

As will be appreciated, a typical Doppler lidar system, when used for conducting 3-D wind studies, uses a single-frequency pulsed laser transmitter and optics arranged in a resonator cavity to transmit and receive coherent light. A portion of transmitted pulse energy is backscattered by aerosols. This backscattered energy enables the received signal to be collected, processed, and analyzed to quantify information of interest such as wind velocities. To this end, the CDWL system 10 shown schematically in FIG. 1 may be mounted to an application-suitable mobile or stationary platform and configured to generate an output beam (arrows $L_O$) toward the surrounding atmosphere. The high pulse repetition rate allows wind measurements through broken clouds 11A or up to thick clouds 11. In general, the transmitted output beam scatters off of suspended aerosols and particulate in the airstream, such that a return energy (arrow $L_R$) is ultimately detected by the CDWL system 10 and recorded for use in generating the above-noted wind data.

In various embodiments, the host platform may include a spacecraft 16, e.g., a satellite, space station, or piloted or autonomous spacecraft, or a fixed-wing and/or rotary aircraft 18. When monitoring characteristics of 3-D winds 12 nearer to ground surface 14, such as horizontal winds 12, the CDWL system 10 may be mounted to a tower 20, or alternatively to a building, bridge, or other fixed structure. A mobile platform 22 such as a weather van or boat may likewise host the system 10 within the scope of the present disclosure. For illustrative consistency, space-based applications studying high-altitude global winds 12 will be referred to hereinafter for the purposes of illustration and consistency.

Figure 2:
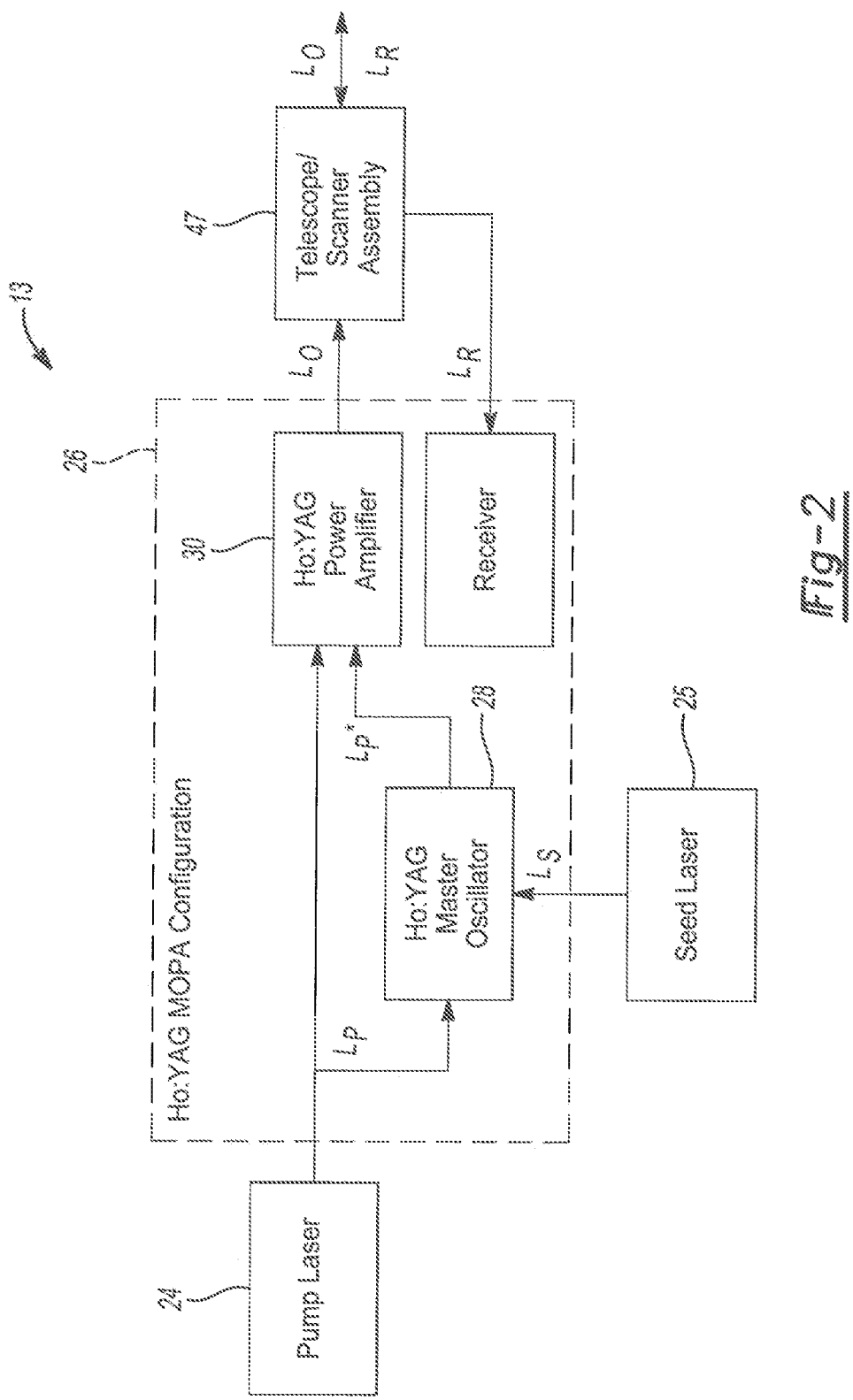
FIG. 2 is a schematic block diagram of primary component arrangement for a 2 µm laser transmitter assembly usable as part of an exemplary CDWL system.

FIG. 2 schematically depicts key components of a laser transmitter assembly 13 that is configured for use as part of the CDWL system 10, with an embodiment of the CDWL system 10 also depicted in FIG. 3 and described below. As set forth herein, the contemplated laser transmitter assembly 13 uses a Holmium-doped yttrium-aluminum-garnet ("Ho:YAG") master oscillator-power amplifier ("MOPA") configuration. Such a solid-state laser, when excited by a pump source and seeded with a seeding source, emits energy at a nominal wavelength of 2 µm.

The present approach is inherently eye-safe and low-risk in terms of acquiring non-exotic components, and is intended to provide multiple advantages over previously proposed systems. Such advantages include a high wall-plug efficiency and high pulse repetition frequency ("PRF") without the accompanying high heat load that typically impedes competing Ho:Thulium ("Tm") co-doped lasers. Additionally, the laser transmitter assembly 13 enables an emission wavelength having high atmospheric transmission as described below with reference to FIGS. 5A and 5B.

Lasing input sources into a MOPA laser transmitter 26 include a pump laser 24 and a seed laser 25, such as a Thulium fiber ("Tm:Fiber") laser, e.g., Tm:YLF, or alternatively a semiconductor laser operating at a nominal wavelength of 1.905 µm, with a pulse length of 3-5 ms and total pump power of 100 W or less. The seed laser 25 may be embodied as a semiconductor or a solid-state seed laser operating at a nominal wavelength of 2.0965 µm, with the seed laser 25 possibly being a narrow line width continuous wave laser device. The MOPA laser transmitter 26 is formed from an arrangement of a Ho:YAG master oscillator crystal 28 and a Ho:YAG power amplifier crystal 30, with an exemplary optimal and compact arrangement described below with reference to FIG. 3.

As depicted in FIG. 2, the master oscillator crystal 28 and the power amplifier crystal 30 are in parallel and serial paths, with the master oscillator crystal 28 being end-pumped by a pump beam (arrow $L_P$) emitted by the pump laser 24. At the same time, the master oscillator crystal 28 is injection-seeded by injecting a seeding beam (arrow $L_S$) from the seed laser 25. Key parameters of the various components are also shown in FIG. 6. In terms of doping concentration, optimal results may be realized with Holmium doping concentrations in the range of 0.5% to 1.0%, and with the YAG crystals having a length of 40-50 mm and a square cross-section of 2.5 mm.

The master oscillator crystal 28 may be used to provide an exemplary output total beam energy of at least 10 mJ at a PRF of 200-300 Hz, and with a pulse length of about 100-200 ns. The pump beam (arrow $L_P$) radius should be kept at 1 mm throughout the various light paths of the laser transmitter assembly 13. Part of the pump beam excites the master oscillator crystal 28. The master oscillator crystal 28 also receives the incident seeding beam (arrow $L_S$) from the seed laser 25 as shown.

Figure 3:
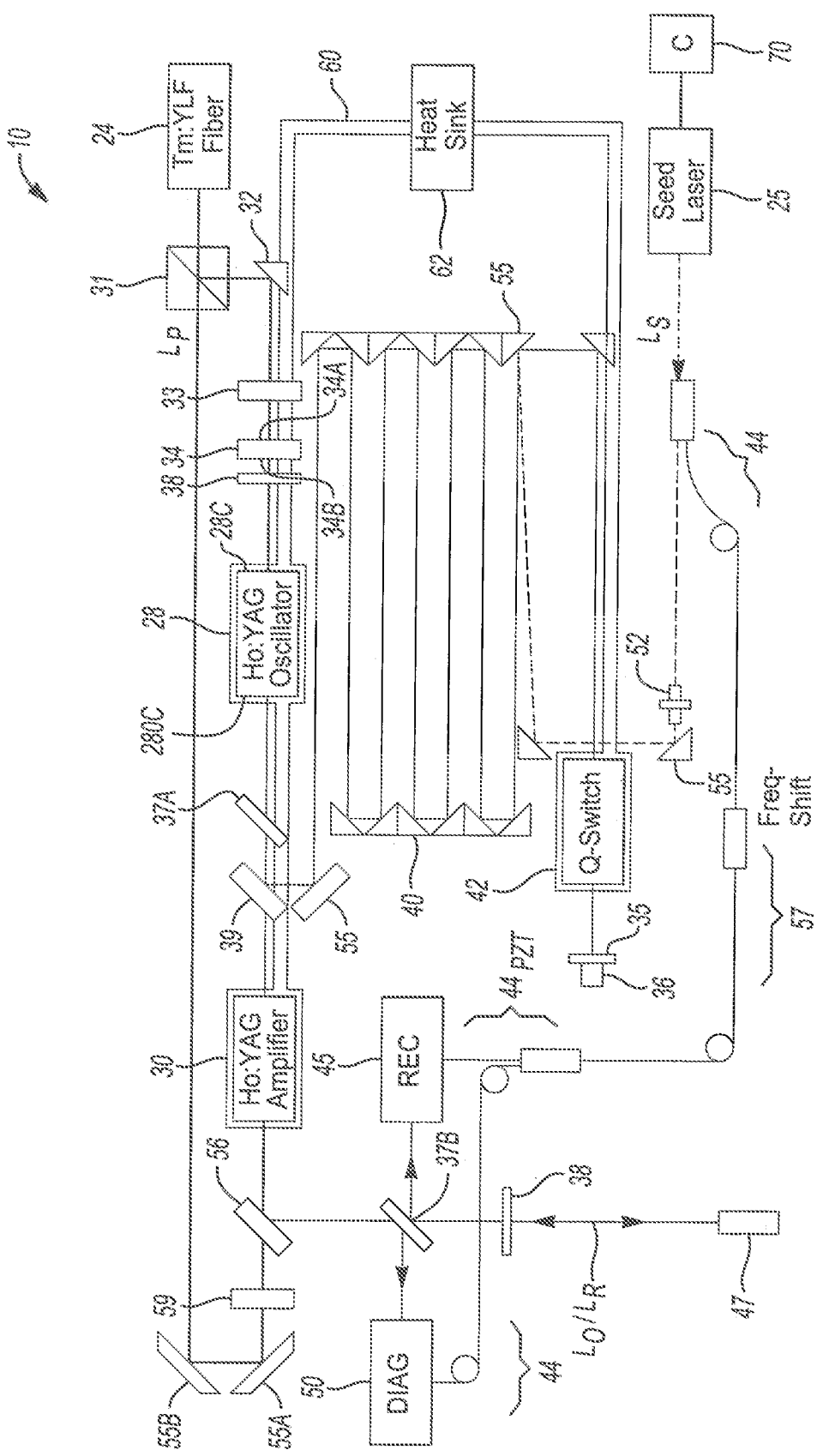
FIG. 3 is a schematic plan view illustration of an embodiment of a CDWL system usable in the various applications illustrated in FIG. 1.

As will be appreciated, a master oscillator such as the Ho:YAG master oscillator crystal 28 of FIGS. 2 and 3 will follow the wavelength of the seeding beam (arrow $L_S$) emitted by the seed laser 25, and thus the seed laser 25 effectively sets the line width of a resultant unamplified or raw laser beam $L_P^*$ emitted by the master oscillator crystal 28. The downstream power amplifier crystal 30, which is also constructed of Ho:YAG as noted above, thereafter receives the other part of the pump beam (arrow L) and the raw laser beam $L_P^*$, which are combined and amplified by the power amplifier crystal 30 before being output as an output laser beam (arrow $L_O$) with 35 mJ of energy toward a desired scene, e.g., broken clouds 11A or free space area as shown FIG. 1, e.g., during a global wind detection mission.

The seed laser 25 of FIGS. 2 and 3 may be embodied as a commercially-available kHz-level narrow line continuous wave ("CW") laser source, e.g., <10 kHz. CDWL applications require a spectrally-narrow output which imposes injection seeding of the master oscillator crystal 28. For the present lidar-based wind detection applications, 20-30 mW of seeding power from the seed laser 25 is sufficient. With the advent of progress made in the area of 2 µm fiber devices, highly compact fiber amplifiers are also available, and can be used to amplify the seeding beam (arrow $L_S$). An advantage of using semiconductor lasers is frequency agility. However, solid-state lasers can also be used for this purpose.

In order for the laser transmitter assembly 13 of FIG. 2 to be suitable for effective use in a CDWL mission of the type contemplated herein, a critical tradeoff must first be made between energy-per-pulse and PRF. Cloud scene porosity and shot integration over varying wind fields are two primary considerations. From a science data perspective, partly cloudy scenes offer strong returns from the tops of and within the clouds 11 depicted schematically in FIG. 1, as well as the opportunity for useful retrievals of wind data below broken clouds 11A. A higher PRF at the expense of pulse energy may provide greater probability of probing the atmosphere below broken clouds 11A, but at the risk of a weaker signal return due to lower energy. An optimal energy-versus-PRF configuration based on a nominal 5-10 W laser suggests a PRF of about 50-300 Hz and a pulse energy of about 30-100 mJ. Thus, the laser transmitter assembly 13 detailed herein should be designed to work within these defined boundaries in order to optimize the return signature in the CDWL system 10 of FIG. 1, while realizing a yield of sixty-times more cloud penetration and up to sixty-times more wind measurements below cloud layers during space-based wind detection missions.

FIG. 3 depicts a possible packaging embodiment of the laser transmitter assembly 13 described above with the CDWL system 10. The pump laser 24 is used for end-pumping the master oscillator crystal 28 and the power amplifier crystal 30 as noted above. The pump beam (arrow $L_P$) emitted by the pump laser 24 is collimated before being split, e.g., using a polarization beam splitter 31 coated with a suitable anti-reflection material. The function of the beam splitter 31 includes protection of the pump laser 24 from back-reflected and residual pump beam energy, as will be appreciated. A portion of the pump beam $L_P$ is directed using a prism 32, after which the pump beam $L_P$ is focused into the master oscillator crystal 28 using a suitably configured and positioned lens 33. The focused beam then passes through a dichroic mirror 34. The dichroic mirror 34 is coated with anti-reflective ("AR") coating 34A to pass the pump wavelength at 1.905 µm, and also with a high-reflective ("HR") coating 34B for reflecting a generated wavelength of 2.0965 µm.

The resonator cavity of the CDWL system 10 is set between the dichroic mirror 34 and another similarly-coated mirror 35 mounted on a piezoelectric transducer ("PZT") 36. The effective cavity length between mirrors 34 and 35 is about 2.8 m in the illustrated exemplary embodiment, although this length can be changed based on the number of beam stretching optics. The exemplary 2.8 m cavity length is suitable for producing a 200 ns pulse length in the resonant cavity, with 100-200 ns being possible in other embodiments. Polarization control optics 37A and 37B are also introduced in the resonator cavity, while the control optics 37A polarizes the 2 µm beam from the master oscillator crystal 28.

Additionally, a quarter-wave plate 38 serves as a mode twister to avoid the spatial hole burning. An end-pumped surface 28C of the Ho:YAG crystal, i.e., the master oscillator crystal 28, is coated with a broadband AR coating to pass both the pump and lasing wavelengths, while the opposite surface 280C is coated with an HR coating for the pump and an AR coating for the lasing wavelength. This approach will help form a double-pass pump, as that term is well understood in the art. A useful target output energy or total beam energy in this particular application may be at least 35 mJ at a PRF of 200-300 Hz.

Still referring to FIG. 3, the 2 μm beam is output-coupled through a partial reflective mirror 39 into the power amplifier crystal 30. The beam present in the resonant cavity of the laser transmitter assembly 13 is then routed to an arranged set of beam stretching optics 40 constructed, e.g., of micro corner cubes. The optics 40 increase the effective cavity length and achieve a sufficiently long temporal pulse output. The beam then travels through a Q-switch 42 before falling incident upon the mirror 35 mounted on the PZT 36 as noted above, the latter of which is used to adjust the cavity length during the injection seeding process.

The pump laser 24 may be a CW or a pulsed device. In order to inhibit CW laser radiation, a Q-switch 42 may be used in the oscillator for generating the pulsed 2-μm radiation. As a result, power required to drive the Q-switch 42 is minimized. Possible approaches for accomplishing such ends include using an acousto-optic embodiment of the Q-switch 42, e.g., based on a Tellurium dioxide material, or another suitable construction using low power. As used herein, "low power" means about 3-5 W, as opposed to about 100 W for a fused silica-based Q-switch of the type ordinarily used for switching control of high-energy oscillators.

The seed laser 25 shown in FIG. 3 may be a commercially available semiconductor source with very narrow line width, i.e., less than 10 kHz as noted above, which can be fiber coupled. The seeding beam ($L_S$) is split with a fiber beam splitter 44, with about 10% of the power being frequency-shifted via a frequency-shifting component 57 and directed to a receiver 45 and a diagnostic processor 50. 90% of the power is thus injected, through operation of an optical isolator and a polarization conditioning block 52, into the resonator cavity using the Q-switch 42.

The output of the resonator cavity is then injected into the power amplifier crystal 30, which may have a similar coating configuration as the master oscillator crystal 28. The power amplifier crystal 30 is end-pumped with the beam portion emitted from the pump beam splitter 31 and steered using steering optics 55A and 55B and pump focusing optics 59. The output of the power amplifier crystal 30 is reflected by a dichroic mirror 56, which is embodied as dichroic optics configured to reflect light at the 2 μm wavelength. Other steering optics 55 are positioned within the resonant cavity of the laser transmitter assembly 13 as shown, e.g., arranged at 45° to the path of the incident beam, to steer the beam as shown.

Additionally, another thin film polarizer 37B shown in FIG. 3 is used to serve as a transmit/receive ("TR") switch, and is followed by another quarter wave plate 38 to circularize the outgoing beam (arrow $L_O$). The return beam polarization, which is linearized and orthogonally polarized with respect to the outgoing beam $L_O$, is reflected by the thin film polarizer 37B. The reflected beam ($L_R$) is combined with the frequency shifted seed in the receiver 45. The diagnostic processor 50 may also include a detector which heterodynes the outgoing beam and the shifted seed laser. The outgoing beam is then transmitted through a telescope/scanner assembly 47 of the CDWL system 10 toward a scene of interest, and the return backscatter radiation is likewise received through the telescope/scanner assembly 47 and communicated to receiver 45.

The exemplary laser architecture depicted schematically in FIG. 3 includes three components that produce heat during their operation: the master oscillator crystal 28, the power amplifier crystal 30, and the Q-switch 42. Heat from these components may be dissipated through a high thermal conductor 60, such as but not limited to a heat pipe, to a heat sink 62. In space operations, e.g., when the CDWL system 10 is hosted on the spacecraft 16 of FIG. 1, and thus with the low-temperature reservoir of space available for cooling, the heat sink 62 may be embodied as a deep-space oriented radiator. In such an embodiment, the noted components may be conductively cooled via the heat conductor 60. Alternatively, the heat sink 62 may be configured as an air radiator or liquid-based chiller for commercial airborne and terrestrial applications.

In terms of frequency control of the lasing performance using the seed laser 25, the seed laser 25 may use a controller (C) 70 in the form of an injection seeding microcontroller and field programmable gate array-based electronics to perform peak detection and synchronizing of the above-described laser firing. For instance, the seed laser 25 may be injected through the first order of the Q-switch 42. The method of seeding may be based on ramp-and-fire, which relies on adjusting the cavity length to the multiple of the seed wavelength. A ramped voltage derives one of the cavity mirrors 35 mounted on the PZT transducer 36 to obtain a resonance signature from the seeding laser beam ($L_S$) circulating in the resonator cavity. Once resonance is detected, the Q-switch 42 is fired at its peak to produce a seeded output. The PZT selected for this application requires only 10V ramp, which is much lower than previously-used PZT devices that require hundreds of volts.

Figure 4A:
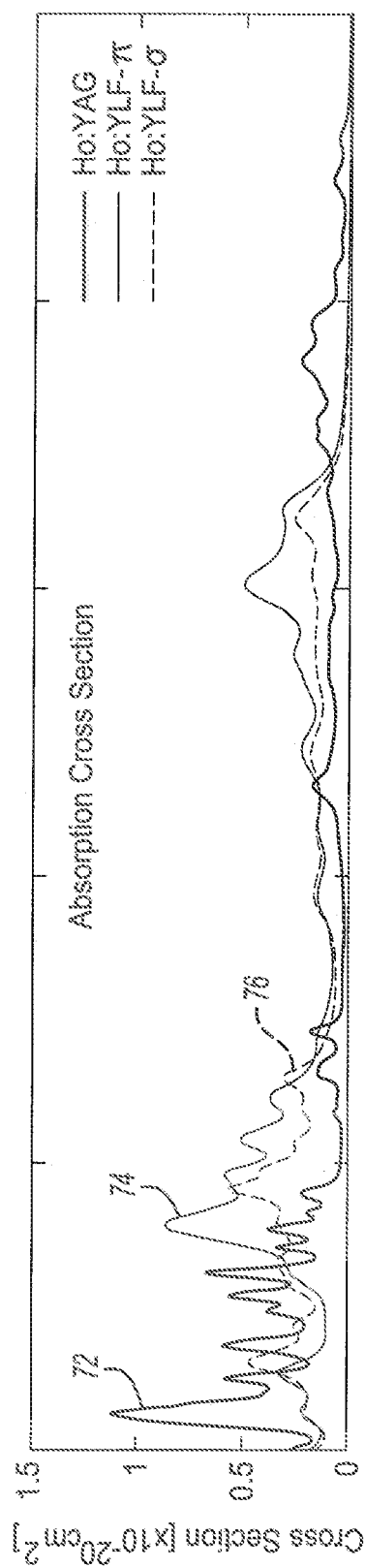
FIGS. 4A and 4B are respective plots of absorption and emission cross-section (y-axis) versus wavelength (x-axis) describing relative advantages of the present 2 µm laser transmitter assembly as depicted in FIGS. 2 and 3 over other technologies.
Figure 4B:
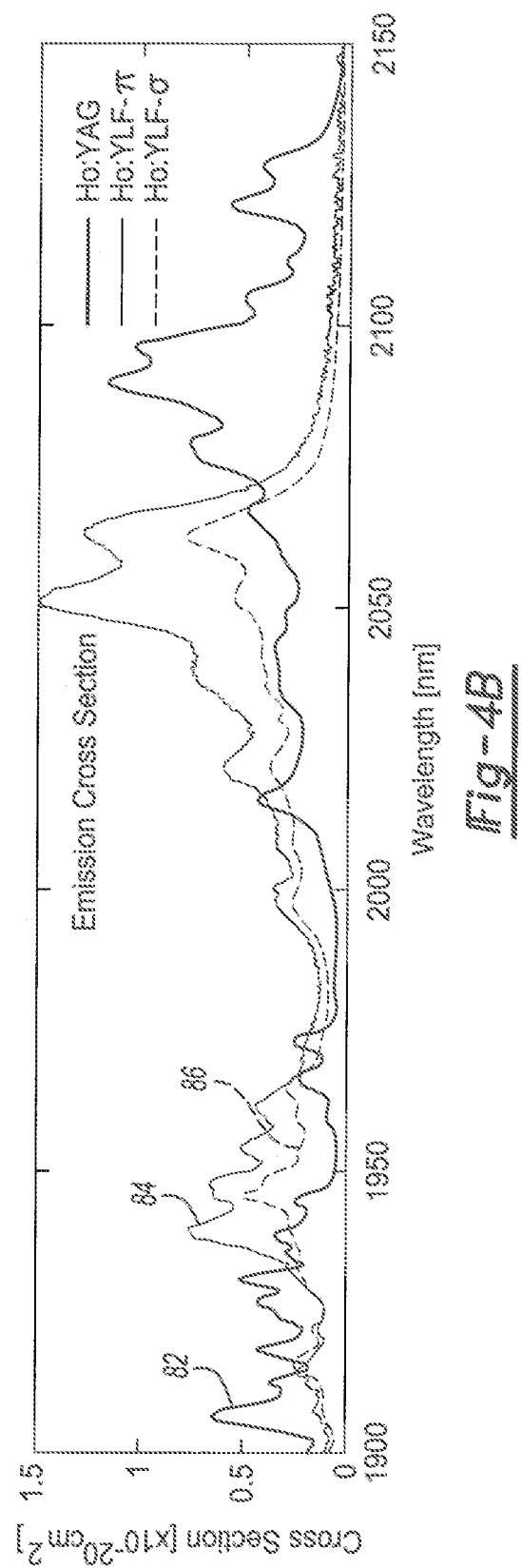

Referring briefly to FIGS. 4A and 4B, the present teachings and setup of FIG. 3 overcomes challenges of side-pumped laser transmitter systems of the types known in the art, as indicated by representative traces 74 and 76 in FIG. 4A and traces 84 and 86 in FIG. 4B. In contrast, the present Ho:YAG crystal absorption and emission cross-sections are depicted as traces 72 and 82, respectively. Advantages of the present approach are many. For instance, the disclosed configuration is based on mature and low-risk space-qualified YAG host crystals. Additionally, use of YAG in the present application is efficient compared to yttrium lithium fluoride (YLF), as YAG has a higher pump absorption cross-section near 1.91 μm when excited, and an emissionQ cross-section at 2.1 μm independent in orientation. This results in higher efficiency and lower heat load. Being isotropic, synthetic YAG crystals are amenable for spatial-hole burning mitigation, which supports a linear cavity architecture without compromising injection seeding. This attribute is important when designing compact, stable, high-seeding efficiency laser. A lower heat load results in a desirably high PRF rate, i.e., >300 Hz, which in turn allows more accurate wind measurements through broken clouds 11A of FIG. 1, at the tops of the clouds 11, and below the clouds 11, thus reducing errors and increasing science data product quantity and quality.

Similarly, FIGS. 5A and 5B depict a representative comparison of atmospheric spectral transmission for the proposed Ho:YAG setup of FIGS. 2 and 3 relative to a co-doped side-pumped Tm:Ho:LuLF laser. One of the major advantages of Ho:YAG is the operating wavelength of 2.0965 nm, which as shown as a higher atmospheric transmission compared to Tm:Ho:LuLF. Tm:Ho:LuLF and Ho:YLF optimum emission wavelengths are located in a relatively lower atmospheric transmission region due to high water vapor absorption. The high variability of atmospheric water vapor results in wavelength changes that may cause high signal loss and/or uncertainty. This in turn requires a rigid wavelength locking scheme.

As will be appreciated, the foregoing disclosure enables a method for detecting and quantifying 3-D winds, e.g., 12 of FIG. 1, using the CDWL system 10. Such a method may include end-pumping the Ho:YAG master oscillator crystal 28 and Ho:YAG power amplifier crystal 30 of the laser transmitter assembly 13 (FIGS. 2 and 3) with a pump beam (arrow $L_P$) from the pump laser 24. The pump beam may have a wavelength of 1.905 μm and a total pump power of less than 100 W, with such end-pumping producing a pulse repetition frequency of 200-300 Hz at a wavelength of 2.0965 μm in this particular embodiment. The method may also include injecting a seeding beam (arrow $L_S$) into the master oscillator crystal 28 via the seed laser 25 at a power level of 20-30 mW, and then transmitting the output laser beam (arrow $L_O$) through the telescope/scanner assembly 47 via the power amplifier crystal 30 at total beam energy of 35 mJ or more.

Thus, the present benefits are realized by end-pumping Holmium-doped crystals using a Thulium fiber laser operating at 1900 nm, which is inherently more efficient than a laser diode operating at 792 nm when pumping co-doped Ho:Tm crystals as noted above. Tm:Fiber can offer higher than 5 kW/cm$^2$ of pump through focusing the beam in an end-pumped configuration as best shown in FIG. 3. Through optimizing the crystal length, the Ho concentration, and the output coupler, the efficiency of the master oscillator crystal 28 can be highly efficient, e.g., by at least a factor of four relative to current configurations. This improvement is due to the combination of the resonantly-pumped architecture and the end-pumped configuration. End-pumping offers higher slope efficiency and lower thresholds. High pump intensity can be easily achieved by minimizing the pump beam radius, with 1 mm being noted herein as optimal. However, this can be achieved only if the laser is designed with a resonantly-pumped configuration, e.g., as in FIG. 3.

In view of the present disclosure, an improved transmitter is enabled using a Tm laser and Ho:YAG crystals for higher absorption, higher emission, lower reabsorption, and lower quantum defects. Seeding is improved using a folded linear cavity architecture to increase temporal pulse width to enhance beam quality with transform limited line-width. The disclosed solutions offer moderate transmitted energy, e.g., 30 mJ/pulse, with a high repetition rate of up to 300 Hz in high atmospheric transmission region for enhanced wind measurements. Low heat loading with conductive cooling and low-risk space-qualified YAG host crystals provides rigid and robust designs suitable for harsh operating environments without compromising science product.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and sub-combinations of the preceding elements and features.

What is claimed is:

1. A laser transmitter assembly for use in a Coherent Doppler Wind Lidar ("CDWL") system, the laser transmitter assembly comprising:
    a telescope/scanner assembly;
    a receiver;
    a master oscillator crystal constructed of Ho:YAG;
    a power amplifier crystal constructed of Ho:YAG and configured, when the master oscillator crystal and the power amplifier crystal are end-pumped, to transmit an output beam through the telescope/scanner assembly with a high repetition rate of 200-300 Hz;
    a pump laser configured to end-pump the master oscillator crystal and the power amplifier crystal using a pump beam having a nominal wavelength of 1.905 μm; and
    a seed laser configured to transmit a seeding beam into the master oscillator crystal at a nominal wavelength of 2.0965 μm and a power level of about 20-30 mW;
    wherein the telescope/scanner assembly is configured to transmit the output beam through an atmosphere toward a scene of interest, collect a backscattered return signal, and communicate the backscattered return signal to the receiver during operation of the CDWL system.

2. The laser transmitter assembly of claim 1, wherein the pump laser is a Tm:YLF fiber.

3. The laser transmitter assembly of claim 1, wherein the pump laser has a pulse length of 3-5 ms.

4. The laser transmitter assembly of claim 1, wherein the seed laser is a narrow line width continuous wave laser.

5. The laser transmitter assembly of claim 1, wherein the output beam has a total beam energy of at least 35 mJ.

6. The laser transmitter assembly of claim 1, wherein about 20% of a total pump energy from the pump laser is applied to the master oscillator crystal, and about 80% of the energy of the pump laser is applied to the power amplifier crystal.

7. The laser transmitter assembly of claim 1, wherein the pump beam from the pump laser has a total pump power of 100 W or less.

8. The laser transmitter assembly of claim 1, wherein a Holmium concentration of the master oscillator crystal and the power amplifier crystal is between 0.5% and 1.0%.

9. The laser transmitter assembly of claim 1, wherein the master oscillator crystal is 40-50 mm in length, and has a square cross section of about 2.5 mm.

10. The laser transmitter assembly of claim 1, further comprising one or more dichroic mirrors coated to pass pump wavelengths of 1.905 μm and reflect a generated wavelength of 2.0965 μm.

11. The laser transmitter assembly of claim 1, wherein the laser transmitter assembly has a linear resonator cavity length of 2.8 m.

12. The laser transmitter assembly of claim 1, further comprising a Q-switch constructed of a Tellurium dioxide material.

13. The laser transmitter assembly of claim 12, further comprising a high thermal conductor configured to stabilize respective temperatures of the master oscillator crystal, the power amplifier crystal, and the Q-switch.

14. A method for detecting and quantifying wind using a Coherent Doppler Lidar ("CDWL") system, the method comprising:
    end-pumping a Ho:YAG master oscillator crystal and a Ho:YAG power amplifier crystal of a laser transmitter assembly with a pump beam from a pump laser, the pump beam having a wavelength of 1.905 μm and a total pump power of less than 100 W, to produce a pulse repetition frequency of 200-300 Hz at a wavelength of 20.0965 μm;
    injecting a seeding beam into the master oscillator crystal via a seed laser at a power level of 20-30 mW; and transmitting an output laser beam through a telescope/scanner assembly of the CDWL system via the power amplifier crystal at total beam energy of 35 mJ or more.

15. The method of claim 14, wherein end-pumping the master oscillator crystal and the power amplifier includes delivering 80% of the total pump energy to the power amplifier crystal and 20% of the total pump energy to the master oscillator crystal.

16. The method of claim 14, wherein the CDWL system includes a Q-switch, the method further comprising: using a high thermal conductor to stabilize respective temperatures of the master oscillator crystal, the power amplifier crystal, and the Q-switch.

17. The method of claim 16, wherein the high thermal conductor includes a heat pipe.

18. The method of claim 14, wherein a doping concentration of Holmium in the master oscillator crystal and the power amplifier crystal is between 0.5% and 1.0%.

19. The method of claim 14, the method further comprising:
arranging one or more dichroic mirrors coated with an anti-reflective coating and a high-reflective coating configured to pass a wavelength of 1.905 μm and reflect a 2.0965 μm, respectively in a resonator cavity of the laser transmitter assembly, the resonator cavity having linear resonator cavity length of 2.8 m.

* * * * *